US008646349B2

(12) United States Patent
Pesola et al.

(10) Patent No.: US 8,646,349 B2
(45) Date of Patent: Feb. 11, 2014

(54) MOTOR-VEHICLE HYBRID PROPULSION SYSTEM INCLUDING A DOUBLE-CLUTCH TRANSMISSION WITH GEAR SHIFT DEVICE COMPRISING A ROTARY DRUM

(75) Inventors: Fabio Pesola, Orbassano (IT); Gianluigi Pregnolato, Orbassano (IT); Andrea Piazza, Orbassano (IT); Marco Garabello, Orbassano (IT); Valter Pastorello, Orbassano (IT)

(73) Assignee: C.R.F. Societa' Consortile per Azioni, Orbassano (Torino) (IT)

( * ) Notice: Subject to any disclaimer, the term of this patent is extended or adjusted under 35 U.S.C. 154(b) by 752 days.

(21) Appl. No.: 12/854,254

(22) Filed: Aug. 11, 2010

(65) Prior Publication Data

US 2011/0113907 A1 May 19, 2011

(30) Foreign Application Priority Data

Nov. 13, 2009 (EP) .................................... 09425461

(51) Int. Cl.
*F16H 3/08* (2006.01)
(52) U.S. Cl.
USPC .......................................................... 74/325
(58) Field of Classification Search
USPC ........... 74/330, 331, 340, 329, 325, 359, 358, 74/665 K, 661; 180/65.21, 65.4
See application file for complete search history.

(56) References Cited

U.S. PATENT DOCUMENTS

| 4,409,858 | A |   | 10/1983 | Lasoen |            |
|-----------|---|---|---------|--------|------------|
| 4,621,537 | A | * | 11/1986 | Piazza et al. | 74/473.24 |
| 5,743,147 | A | * | 4/1998  | Gazyakan | 74/473.25 |
| 6,945,893 | B2 | * | 9/2005 | Grillo et al. | 475/5 |
| 7,197,954 | B2 | * | 4/2007 | Baldascini et al. | 74/331 |
| 7,249,537 | B2 | * | 7/2007 | Lee et al. | 74/661 |
| 7,272,987 | B2 | * | 9/2007 | Hughes | 74/340 |
| 7,311,015 | B2 | * | 12/2007 | Kluge | 74/337.5 |
| 7,363,834 | B2 | * | 4/2008 | Kapp et al. | 74/337.5 |
| 8,069,743 | B2 | * | 12/2011 | Shintani | 74/330 |
| 8,091,447 | B2 | * | 1/2012 | Garabello et al. | 74/473.36 |
| 8,156,836 | B2 | * | 4/2012 | Remmler et al. | 74/331 |

(Continued)

FOREIGN PATENT DOCUMENTS

| DE | 198 00 880 A1 | 4/1999 |
| DE | 103 05 639 A1 | 3/2004 |
| EP | 1 967 771 A1 | 9/2008 |

OTHER PUBLICATIONS

Apr. 13, 2010 European Search Report for EP 09 42 5461.

*Primary Examiner* — Ha D Ho
*Assistant Examiner* — Jude Agendia
(74) *Attorney, Agent, or Firm* — Howard & Howard Attorneys PLLC

(57) ABSTRACT

The hybrid propulsion system for an internal combustion engine having a mechanical gearbox and an electric machine. A gear shift device includes a plurality of sliding engagement sleeves, each arranged to connect a driven gearwheel for rotation with the respective secondary shaft, a corresponding plurality of sliding shift forks, each arranged to cause a respective engagement sleeve to slide between a neutral position and at least one shift position, a rotary drum having on its outer cylindrical surface a corresponding plurality of guide grooves in each of which a respective stud slidably engages for translation with a respective shift fork in the sliding direction of this latter, and an actuation unit arranged to cause the drum to rotate stepwise among a plurality of angular positions each corresponding to predetermined positions of the engagement sleeves.

10 Claims, 6 Drawing Sheets

(56) References Cited

U.S. PATENT DOCUMENTS

| | | | |
|---|---|---|---|
| 8,156,837 B2 * | 4/2012 | Smith | 74/335 |
| 8,522,635 B2 * | 9/2013 | Pastorello et al. | 74/335 |
| 2005/0139035 A1 * | 6/2005 | Lee et al. | 74/661 |
| 2006/0021456 A1 * | 2/2006 | Hughes | 74/340 |

\* cited by examiner

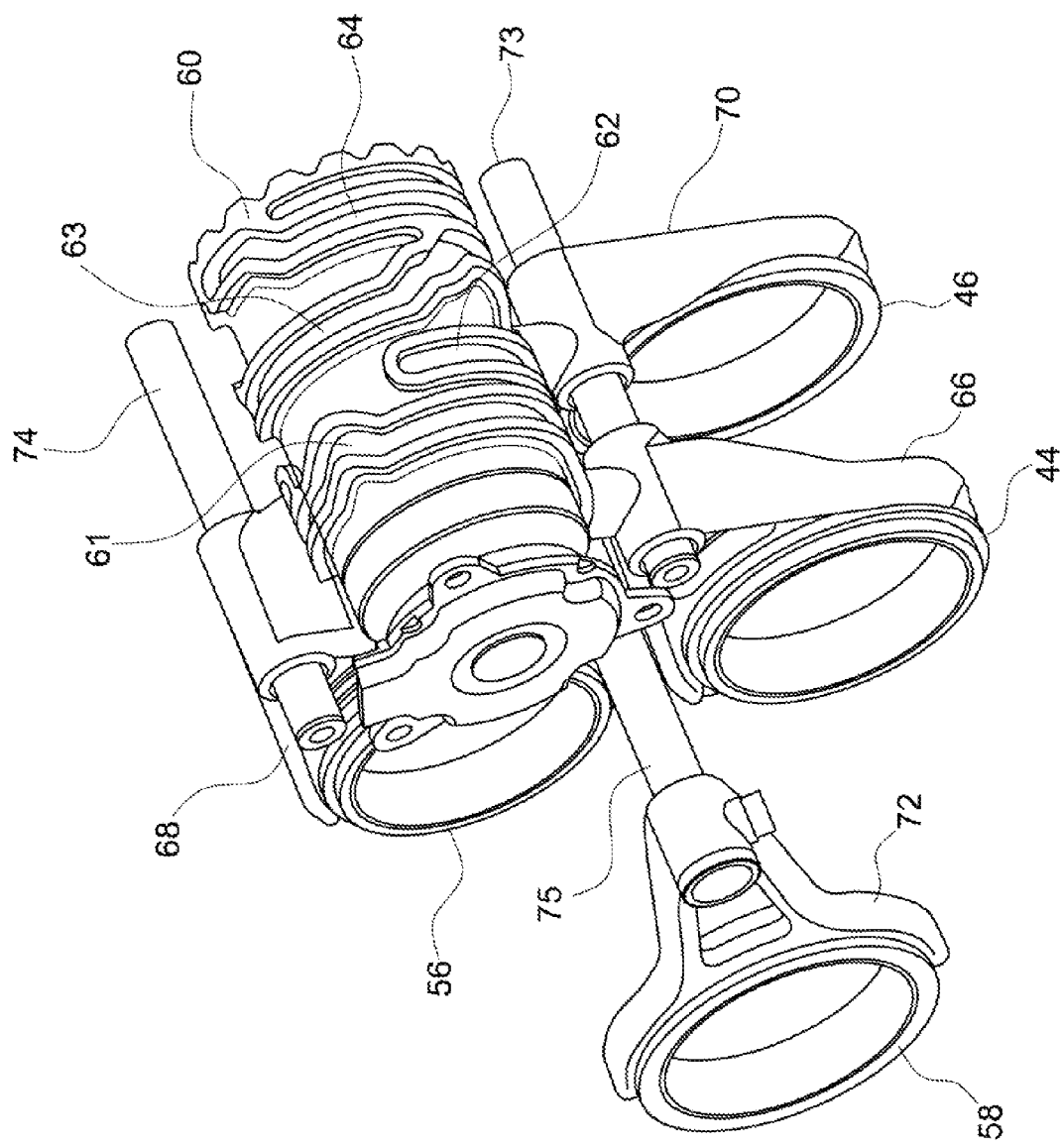

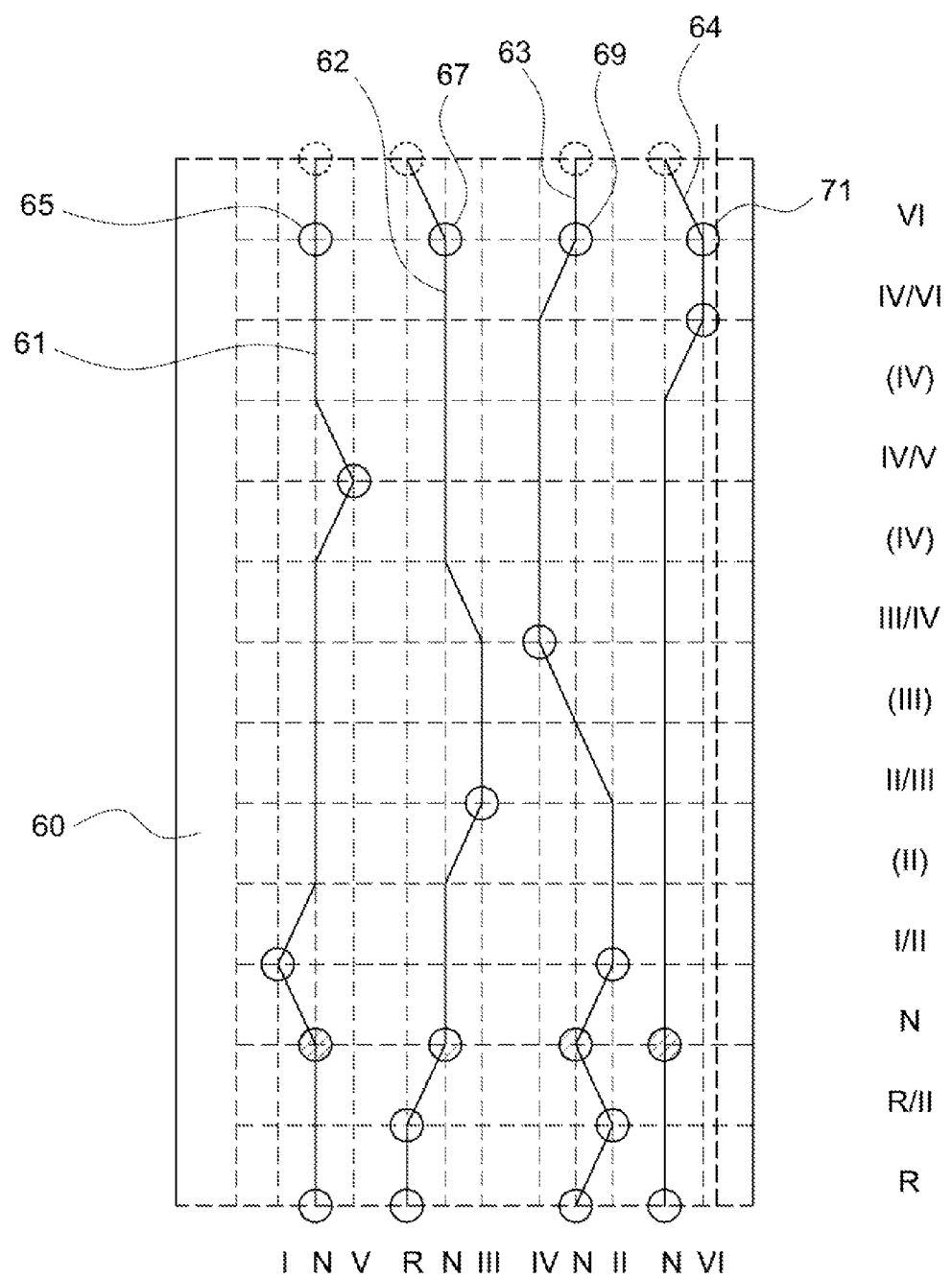

MOTOR-VEHICLE HYBRID PROPULSION SYSTEM INCLUDING A DOUBLE-CLUTCH TRANSMISSION WITH GEAR SHIFT DEVICE COMPRISING A ROTARY DRUM

BACKGROUND OF THE INVENTION

1. Field of the Invention

The present invention relates to a motor-vehicle hybrid propulsion system, and more specifically to such a system including an internal combustion engine, a double-clutch transmission and an electric machine.

2. Description of the Related Art

Hybrid propulsion systems for motor vehicles that have two separate power plants including an internal combustion engine and a source of electric power have been developed as a means of increasing fuel economy and lowering emissions on the vehicles. While these propulsion systems have generally worked for their intended purposes, there remains a need in the art for a system which improves the operational efficiencies in the drive train.

SUMMARY OF THE INVENTION

The present invention overcomes the difficulties in the related art in a motor-vehicle hybrid propulsion system in which the gearbox of the double-clutch transmission comprises a pair of primary shafts and at least one secondary shaft, the first primary shaft carrying driving gearwheels associated to the odd gears (for example, at least first, third and fifth gear) and to the reverse gear, the second primary shaft carrying driving gearwheels associated to the even gears (for example, at least second and fourth gear) and the at least one secondary shaft carrying a plurality of idle driven gearwheels associated to the forward gears and to the reverse gear, and wherein the gear shift device comprises, in addition to the aforesaid rotary drum, a plurality of sliding engagement sleeves, each arranged to connect each time a driven gearwheel corresponding to a given gear for rotation with the respective shaft of the gearbox, a corresponding plurality of sliding shift forks, each arranged to cause a respective engagement sleeve to slide between a neutral position and at least one shift position, and a corresponding plurality of studs, each of which is connected for translation with a respective shift fork in the sliding direction of this latter and is slidably arranged in a respective guide groove provided on the outer cylindrical surface of the drum, and an actuation unit arranged to cause the drum to rotate stepwise among a plurality of angular positions each corresponding to predetermined positions of the engagement sleeves.

It is an object of the present invention to provide a motor-vehicle hybrid propulsion system of the type specified above, which allows an optimized use of the electric machine and ensures a high efficiency. In short, the invention is based on the idea of providing a hybrid propulsion system of the type specified above, in which the guide grooves on the outer cylindrical surface of the drum are shaped in such a manner that in a first angular position of the drum the engagement sleeves are positioned so as to engage at the same time the highest gear and a further forward gear driven by the primary shaft to which the electric machine is cinematically connected. In this way, when the vehicle is running with the highest gear (motorway gear) engaged, the electric machine can operate as a generator to charge the batteries and the electric machine can be used as a booster.

According to a further advantageous aspect of the present invention, the drum is arranged to take a second angular position in which the engagement sleeves are positioned so as to engage only the highest gear. This further angular position of the drum enables to disconnect the electric machine when the vehicle is running with the highest gear engaged and the batteries are charged, and therefore to maximize the efficiency of the propulsion system.

BRIEF DESCRIPTION OF THE DRAWINGS

Further characteristics and advantages of the invention will become clear from the following detailed description, given purely by way of non-limiting example with reference to the appended drawings, in which:

FIG. 5 is a perspective view of a gear shift device associated to the gearbox of FIG. 2; and FIG. 6 is a schematic illustration which shows the development in a plane of the guide grooves of the drum of the gear shift device of FIG. 5, indicating the positions taken by the engagement sleeves in each of the angular positions of the drum.

DETAILED DESCRIPTION OF THE PREFERRED EMBODIMENTS

Figure 1:
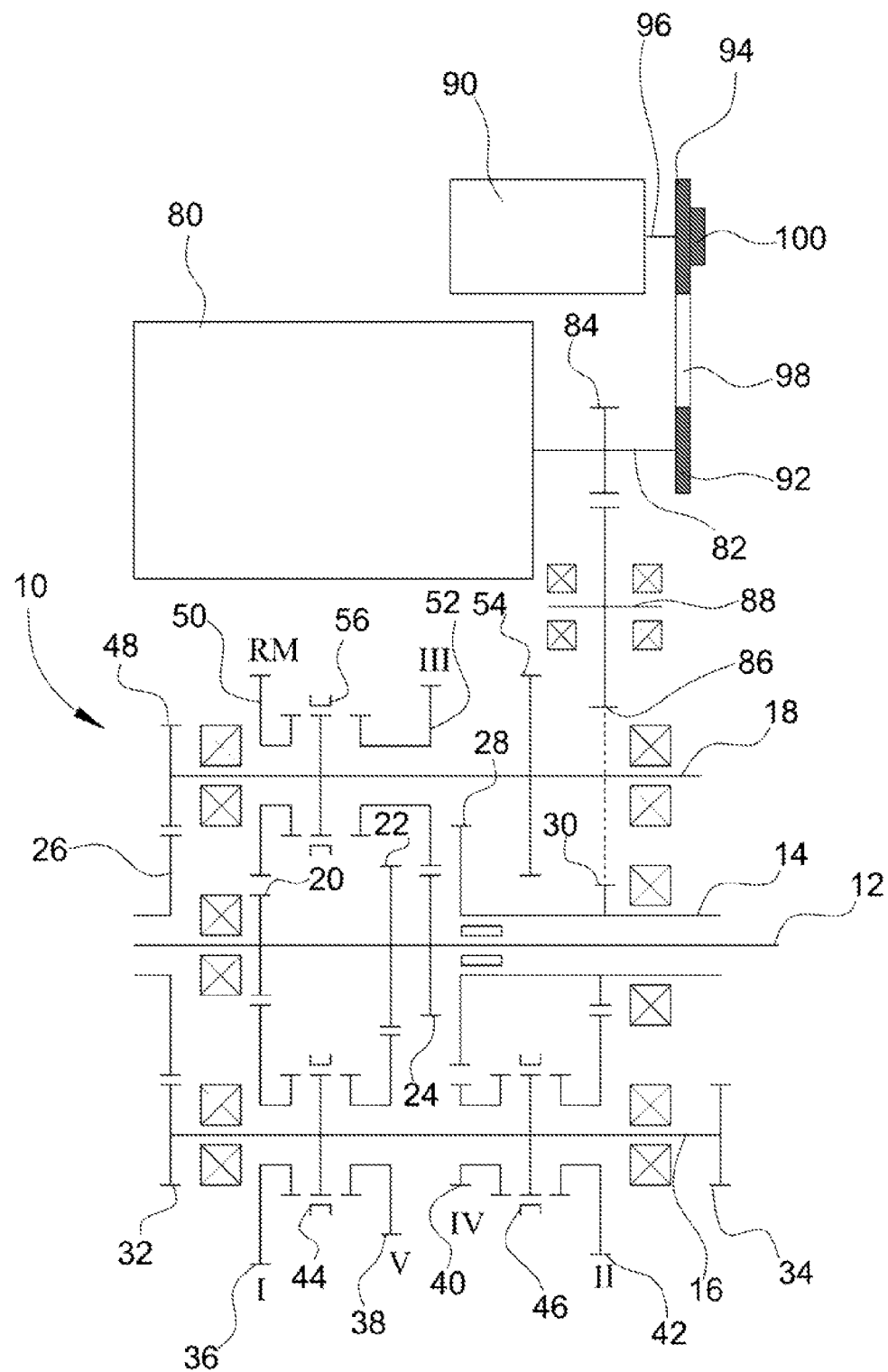
FIG. 1 is a schematic illustration which shows a mechanical gearbox with five forward gears and one reverse gear forming part of a motor-vehicle double-clutch transmission which in turn forms part of a motor-vehicle hybrid propulsion system according to a first embodiment of the present invention, as well as an electric machine connected to the gearbox.

With reference first to FIG. 1, there is illustrated a hybrid propulsion system that is particularly adapted for a motor vehicle having an internal combustion engine and a clutch unit. The hybrid propulsion system includes a mechanical gearbox, generally indicated at 10, and an electric machine, generally indicated at 80. Together, the gearbox 10 and the clutch unit define a double clutch transmission. In the embodiment illustrated in FIG. 1, the gearbox 10 has five forward gears and one reverse gear. However, from the description that follows, those having ordinary skill in the art will appreciate that the gearbox 10 may have any number of forward and reverse gears without departing from the scope of the present invention and that the embodiments illustrated herein are merely for descriptive purposes. More specifically, the gearbox 10 illustrated in FIG. 1 includes a first primary shaft 12 torsionally connected to a crankshaft of the internal combustion engine by means of a first friction clutch of the clutch unit.

A second primary shaft 14 is torsionally connected to the crankshaft of the internal combustion engine of the motor vehicle by means of a second friction clutch of the clutch unit. In the embodiment illustrated herein, the second primary shaft 14 is arranged coaxially with the first primary shaft 12, and in particular, according to the illustrated example, outside the first primary shaft 12. In addition, a secondary shaft 16 and a lay shaft 18 are both arranged parallel to the two primary shafts 12 and 14.

The first primary shaft 12 (inner primary shaft) projects axially from the second primary shaft 14 (outer primary shaft) and carries, in order from the side axially opposite to the clutch unit (left-hand side relative to the observer of FIG. 1) to the side axially facing the clutch unit (right-hand side relative to the observer of FIG. 1), a gearwheel 20 acting as driving gearwheel for both the gear train of first gear and the gear train of reverse gear, a gearwheel 22 acting as driving gearwheel for the gear train of fifth gear and a gearwheel 24 acting as driving gearwheel for the gear train of third gear. The first primary shaft 12 also carries, at the left-hand end relative to the observer of FIG. 1, an idle gearwheel 26 acting as intermediate gearwheel of a gear train which cinematically connects the lay shaft 18 to the secondary shaft 16, as will be further explained in greater detail below. The second primary shaft 14 carries, in order from left to right relative to the observer of FIG. 1, a gearwheel 28 acting as driving gearwheel for the gear train of fourth gear and a gearwheel 30 acting as driving gearwheel for the gear train of second gear. The driving gearwheels 20, 22, 24, 28 and 30 mentioned above are made as fixed gearwheels for rotation with the respective shafts.

The secondary shaft 16 carries, at the end axially opposite to the clutch unit, a fixed gearwheel 32 that meshes with the idle gearwheel 26 of the first primary shaft 12 and, at the end axially facing the clutch unit, a final reduction pinion 34 that meshes with an input gearwheel or ring gear of a differential gear of the motor vehicle (not shown). The secondary shaft 16 also carries between the gearwheel 32 and the final reduction pinion 34, in order from left to right relative to the observer of FIG. 1, a gearwheel 36 disposed in meshing relationship with the driving gearwheel 20 and acting as driven gearwheel of the gear train of first gear, a gearwheel 38 disposed in meshing relationship with the driving gearwheel 22 and acting as driven gearwheel of the gear train of fifth gear, a gearwheel 40 disposed in meshing relationship with the driving gearwheel 28 and acting as driven gearwheel of the gear train of fourth gear, and a gearwheel 42 disposed in meshing relationship with the driving gearwheel 30 and acting as driven gearwheel of the gear train of second gear. The driven gearwheels 36, 38, 40 and 42 mentioned above are made as idle gearwheels and are selectively connectable for rotation with the secondary shaft 16 by means of a pair of sliding engagement sleeves 44 and 46. More precisely, the sliding engagement sleeve 44 is interposed between the gearwheels 36 and 38 and is selectively movable to the left or to the right as viewed in FIG. 1, passing through a central neutral position, to connect the gearwheel 36 or the gearwheel 38, respectively, for rotation with the secondary shaft 16, thereby engaging the first gear or the fifth gear, respectively. On the other hand, the sliding engagement sleeve 46 is interposed between the gearwheels 40 and 42 and is selectively movable to the left or to the right as viewed in FIG. 1, passing through a central neutral position, to connect the gearwheel 40 or the gearwheel 42, respectively, for rotation with the secondary shaft 16, thereby engaging the fourth gear or the second gear, respectively.

The lay shaft 18 carries, at the end axially opposite to the clutch unit, a fixed gearwheel 48 that is disposed in meshing relationship with the idle gearwheel 26 of the first primary shaft 12 in such a manner that the lay shaft 18 is cinematically connected with the secondary shaft 16 by means of the gear train formed by the gearwheel 48 which is fast for rotation with the lay shaft 18, by the idle gearwheel 26 which is coaxial with the first primary shaft 12 and by the gearwheel 32 which is fast for rotation with the secondary shaft 16. The lay shaft 18 also carries, in order from left to right relative to the observer of FIG. 1, a gearwheel 50 disposed in meshing relationship with the gearwheel 36 carried by the secondary shaft 16 and acting as intermediate gearwheel of the gear train of reverse gear, a gearwheel 52 disposed in meshing relationship with the driving gearwheel 24 carried by the first primary shaft 12 and acting as intermediate gearwheel of the gear train of third gear and a gearwheel 54 acting as parking gearwheel. The intermediate gearwheels 50 and 52 mentioned above are made as idle gearwheels, whereas the parking gearwheel 54 is made as fixed gearwheel. A sliding engagement sleeve 56 is interposed between the gearwheels 50 and 52 and is selectively movable to the left or to the right as viewed in FIG. 1, passing through a central neutral position, to connect the gearwheel 50 or the gearwheel 52, respectively, for rotation with the lay shaft 18, thereby engaging the reverse gear or the third gear, respectively.

Therefore, the transmission of the torque in reverse gear and in at least one of the forward gears (in the present case the third gear) takes place via the lay shaft 18. More specifically, with the reverse gear engaged (engagement sleeve 56 in the left-hand shift position), the torque is transmitted from the first primary shaft 12 to the lay shaft 18 via the gear train formed by the gearwheel 20 carried by the primary shaft 12 and acting as driving gearwheel, by the gearwheel 36 carried by the secondary shaft 16 and acting as idle gearwheel, and by the gearwheel 50 carried by the lay shaft 18 and acting as driven gearwheel, and then from the lay shaft 18 to the secondary shaft 16 via the gear train formed by the gearwheel 48 carried by the lay shaft 18 and acting as driving gearwheel, by the gearwheel 26 carried by the first primary shaft 12 and acting as idle gearwheel, and by the gearwheel 32 carried by the secondary shaft 16 and acting as driven gearwheel. With the third gear engaged (engagement sleeve 56 in the right-hand shift position), the torque is transmitted from the first primary shaft 12 to the lay shaft 18 via the gear train formed by the gearwheel 24 carried by the primary shaft 12 and acting as driving gearwheel, and by the gearwheel 52 carried by the lay shaft 18 and acting as driven gearwheel, and then from the lay shaft 18 to the secondary shaft 16 via the above-described gear train formed by the gearwheels 48, 26 and 32.

The gearbox described above with reference to FIG. 1 allows to carry out all the single gear shifts in the so-called powershift mode, i.e. with the old and new gears engaged at the same time, apart from the gear shift from the first gear to the reverse gear and vice versa, since all the driving gearwheels associated to the odd gears (first, third and fifth gears) are carried by a primary shaft (in the present case the first primary shaft 12), whereas all the driving gearwheels associated to the even gears (second and fourth gears) are carried by the other primary shaft (in the present case the second primary shaft 14).

In the embodiment illustrated herein, the electric machine 80 is arranged parallel to the gearbox, i.e. with the axis of an output shaft 82 thereof arranged parallel to the axes of the shafts 12, 14, 16 and 18 of the gearbox. The electric machine 80 is cinematically connected to either of the primary shafts 12, 14 (in the proposed example to the second primary shaft 14 associated to the even gears) of the gearbox 10 via a gear train consisting of a pinion 84 carried by the output shaft 82 of the electric machine 80, of an intermediate gearwheel 86 carried by a special intermediate shaft 88 (supported by the case of the gearbox 10) and disposed in meshing relationship with the pinion 84, and of one of the gearwheels carried by the aforesaid primary shaft 12, 14 of the gearbox (in the example of FIG. 1 of the gearwheel 30 acting as driving gearwheel for the gear train of second gear). By virtue of the direct connection with either of the two primary shafts of the gearbox, the electric machine 80 is able to perform, in addition to the usual functions of traction (generation of mechanical power for the wheels of the vehicle taking energy from the high-voltage batteries of the vehicle) and of generation (generation of electrical power for the high-voltage batteries of the vehicle taking energy from the recovery of the kinetic energy of the vehicle or from the operation of the internal combustion engine when the vehicle is still), also the functions of alternator and of starting motor, and hence makes it possible to avoid the use of additional alternator and starting motor.

Advantageously, the electric machine 80 is also connected to a compressor 90 of the air conditioner by means of a driving pulley 92 mounted on the output shaft 82 of the electric machine 80, a driven pulley 94 mounted on a drive shaft 96 of the compressor 90, a belt 98 wound on the two pulleys 92 and 94, and an electromagnetic clutch 100 associated to the driven pulley 94. The electric machine 80 is thus able to perform the additional function of generating mechanical power for the compressor 90 of the air conditioner, which is particularly useful as it allows the compressor of the air conditioner to operate also when the internal combustion engine is not running. The electric machine 80 and the compressor 90 of the air conditioner (in case of the compressor being connected to the electric machine) can thus be shifted from the side of the internal combustion engine to the side of the gearbox of the motor vehicle.

Figure 2:
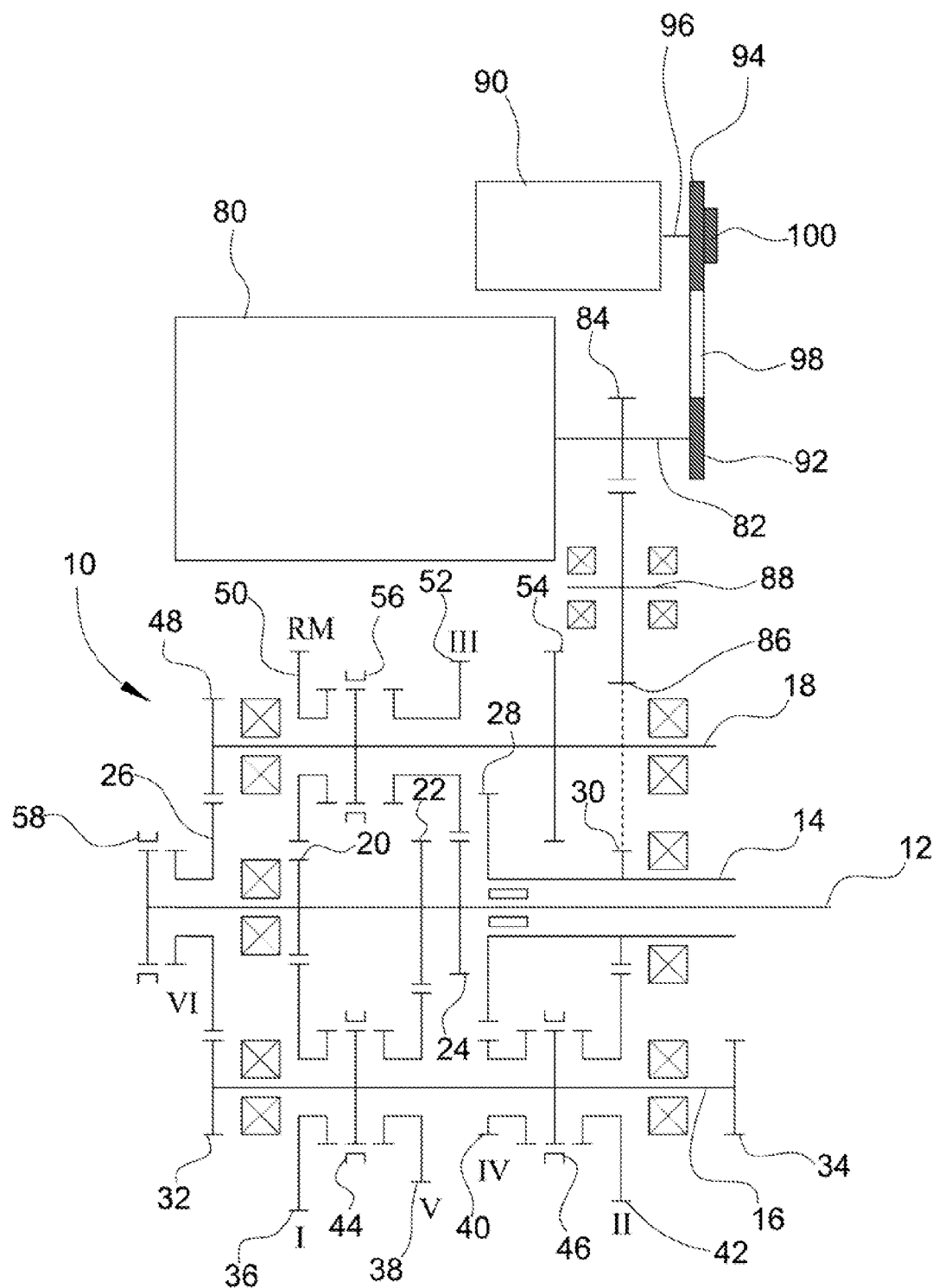
FIG. 2 is a schematic illustration which shows a mechanical gearbox with six forward gears and one reverse gear forming part of a motor-vehicle double-clutch transmission which in turn forms part of a motor-vehicle hybrid propulsion system according to a further embodiment of the present invention, as well as an electric machine connected to the gearbox.

A further embodiment of the invention is illustrated in FIG. 2, where parts and elements identical or similar to those of FIG. 1 have been given the same reference numerals.

The gearbox 10 shown in FIG. 2 has six forward gears and one reverse gear which also comprises a pair of primary shafts 12 and 14, a secondary shaft 16 and a lay shaft 18. The arrangement of the gearwheels associated to the first five forward gears and to the reverse gear is identical to that of the gearbox of FIG. 1, and therefore reference is made to the above detailed description of that gearbox. The sixth gear is obtained by adding a sliding engagement sleeve 58 associated to the gearwheel 26 to connect it for rotation with the first primary shaft 12. In this way, when the sliding engagement sleeve 58 is operated to connect the gearwheel 26 for rotation with the first primary shaft 12, the torque is transmitted directly from the first primary shaft 12 to the secondary shaft 16 via the gear train formed by the gearwheel 26 acting as driving gearwheel and by the gearwheel 32 acting as driven gearwheel.

The gearbox according to FIG. 2 offers the same advantages mentioned above with reference to the gearbox of FIG. 1, with the difference that in the present case the gear shift from the fifth gear to the sixth gear, and vice versa, is not allowed in powershift mode, but the gear shift from the sixth gear to the fourth or second gear in case of a so-called kick-down is anyway allowed in powershift mode.

As far as the electric machine 80 is concerned, the previous description relating to FIG. 1 fully applies.

According to an aspect of the present invention, which may be provided for in both the embodiments described above, the electric machine is advantageously integrated in the gearbox. More specifically, with reference to FIG. 3, where parts and elements identical or similar to those of FIG. 2 have been given the same reference numerals, the electric machine 80 is inserted and fixed into a special seat 102 formed by the case of the gearbox, in such a manner that a spiral-shaped profile 104 of the cooling circuit of the electric machine formed on the outer surface of a stator 106 of the electric machine is closed on the radially outer side by an inner cylindrical surface 108 of the seat 102, the channels of the cooling circuit being therefore defined between the spiral-shaped profile 104 and the inner cylindrical surface 108.

The gearbox 10 forming part of the hybrid propulsion system according to the invention is also provided with a gear shift device arranged to control sequentially the engagement of the gears by controlling the displacement of the engagement sleeves of the gearbox between the respective neutral and shift positions.

Figure 3:
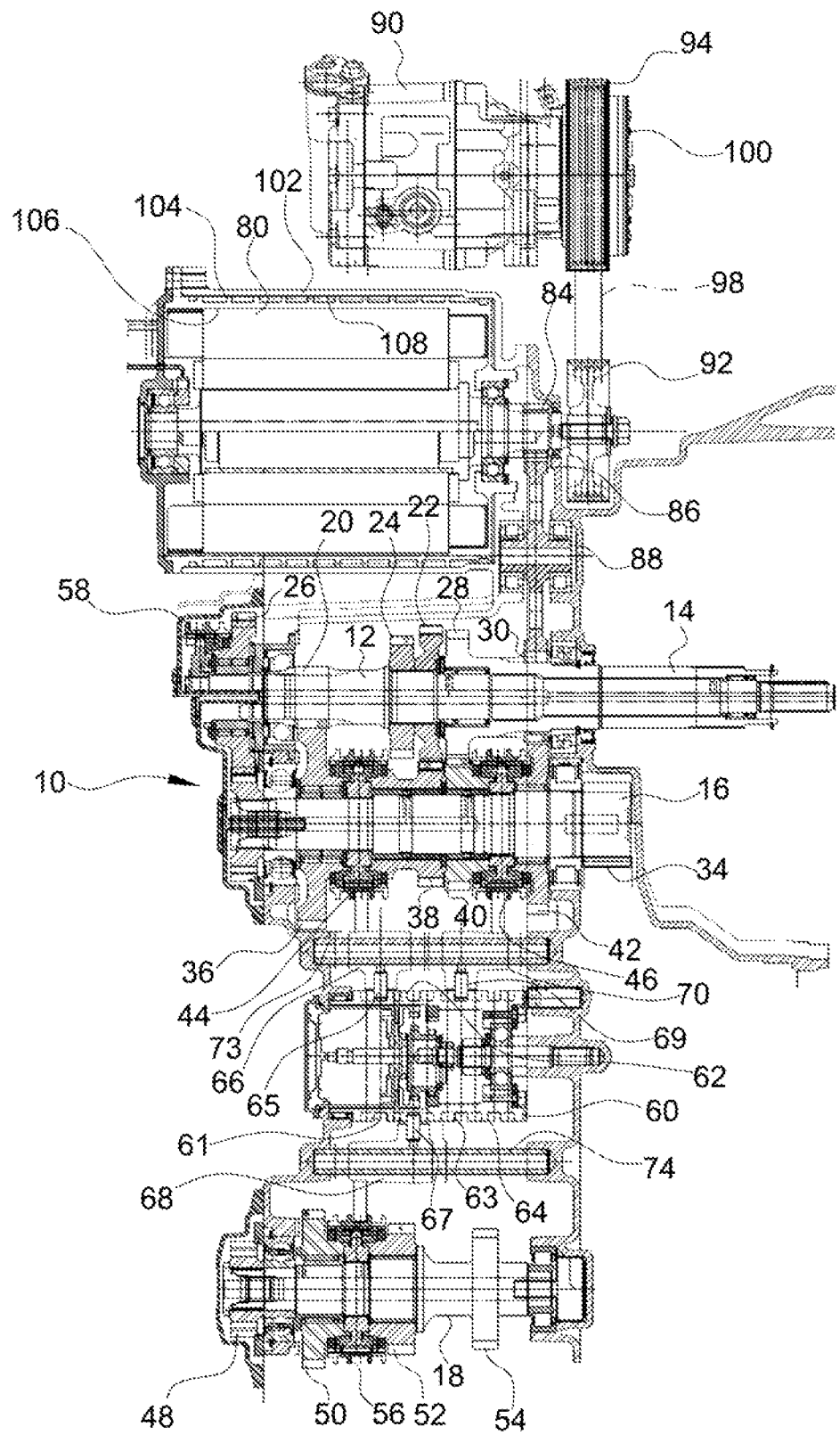
FIG. 3 is a section view of the gearbox of FIG. 2, with the associated electric machine.
Figure 4:
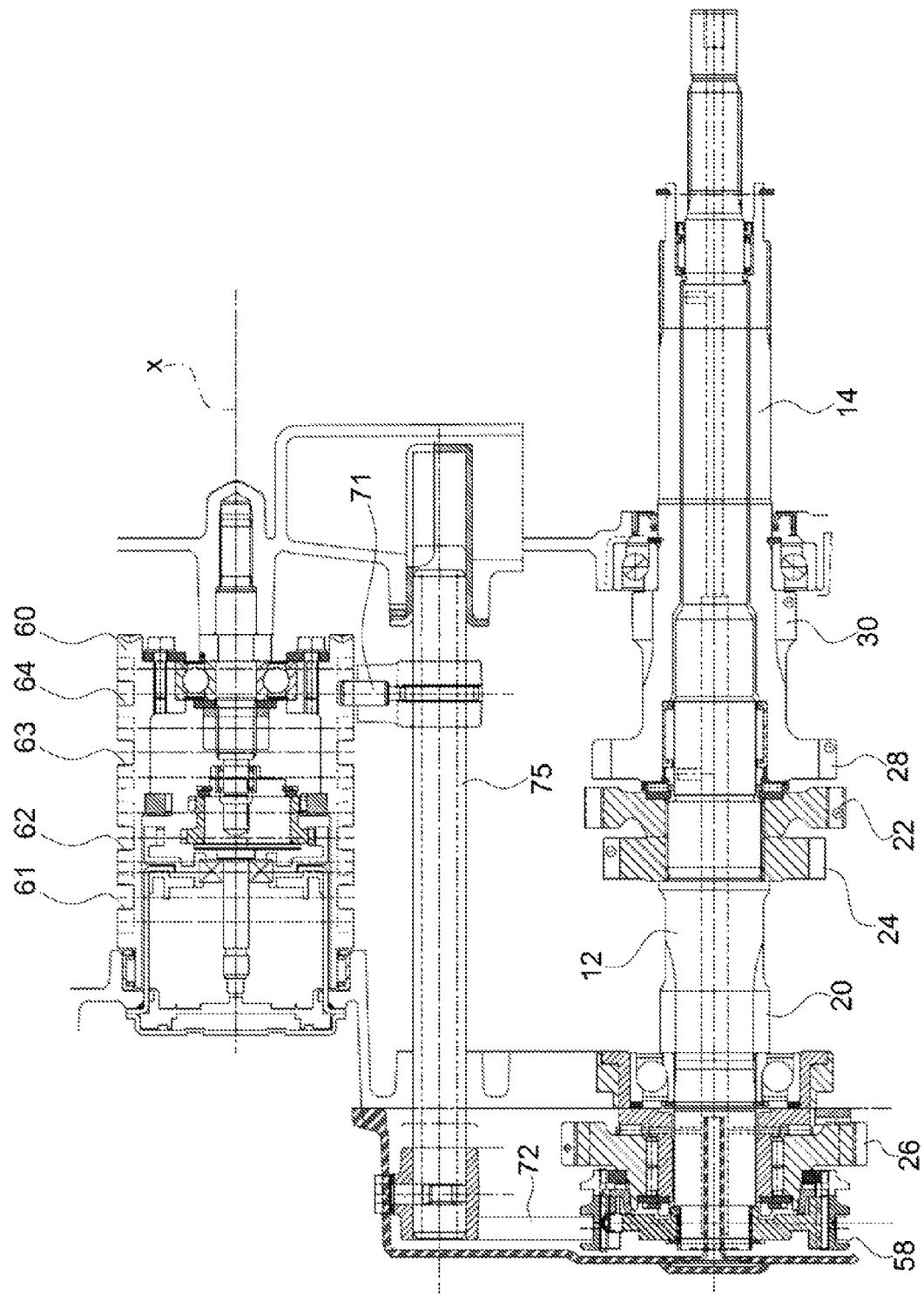
FIG. 4 is a further partial section view of the gearbox of FIG. 2, which shows on an enlarged scale a shift fork associated to an engagement sleeve controlling the engagement of the sixth gear.

With reference in particular to FIGS. 3 to 5, the gear shift device will be described now in combination with the gearbox illustrated in FIGS. 2 and 3. As noted above, the gearbox of FIGS. 2 and 3 has six forward gears and one reverse gear, in which the gears are engaged by means of the four engagement sleeves 44, 46, 56 and 58 associated with the first and fifth gears, to the fourth and second gears, to the reverse and third gears, and to the sixth gear, respectively. More specifically, the engagement sleeve 44 can be displaced to the left and to the right as viewed in FIGS. 2 and 3, starting from a central neutral position, into a left-hand shift position in which it engages the first gear and into a right-hand shift position in which it engages the fifth gear, respectively. The engagement sleeve 46 can be displaced to the left and to the right as viewed in FIGS. 2 and 3, starting from a central neutral position, into a left-hand shift position in which it engages the fourth gear and into a right-hand shift position in which it engages the second gear, respectively. The engagement sleeve 56 can be displaced to the left and to the right as viewed in FIGS. 2 and 3, starting from a central neutral position, into a left-hand shift position in which it engages the reverse gear and into a right-hand shift position in which it engages the third gear, respectively. Finally, the engagement sleeve 58 can be displaced to the right as viewed in FIGS. 2 and 3, starting from a central neutral position, into a right-hand shift position in which it engages the sixth gear.

The gear shift device includes a rotary drum 60, whose axis of rotation (indicated X in FIG. 4) coincides with the geometrical axis of the drum and is arranged parallel to the axes of the shafts 12, 14, 16 and 18 of the gearbox 10. Four guide grooves 61, 62, 63 and 64 are provided, in order from left to right relative to the observer of FIGS. 3 to 5, on the outer cylindrical surface of the drum 60. A stud 65 slidably engages in the guide groove 61 and is rigidly connected for axial translation (i.e. in a direction parallel to the above-defined axis X) with a shift fork 66, which in turn is rigidly connected for axial translation with the engagement sleeve 44 associated to the first and fifth gears. A stud 67 slidably engages in the guide groove 62 and is rigidly connected for axial translation with a shift fork 68, which in turn is rigidly connected for axial translation with the engagement sleeve 56 associated to the reverse and third gears. A stud 69 slidably engages in the guide groove 63 and is rigidly connected for axial translation with a shift fork 70, which in turn is rigidly connected for axial translation with the engagement sleeve 46 associated to the fourth and second gears. Finally, a stud 71 slidably engages in the guide groove 64 and is rigidly connected for axial translation with a shift fork 72, which in turn is rigidly connected for axial translation with the engagement sleeve 58 associated to the sixth gear. The shift forks 66 and 70 associated to the engagement sleeves 44 and 46 are slidably mounted along a stationary rod 73, while the shift fork 68 is slidably mounted along a stationary rod 74. The two stationary rods 73 and 74 are fixed to the case of the gearbox 10. The shift fork 72 associated to the engagement sleeve 58 is fixed to a sliding rod 75 supported by the case of the gearbox 10. It is however clear that the arrangement of the shift forks and of the respective rods may differ from the one described and illustrated herein.

The gear shift device further comprises an actuation unit arranged to cause the drum 60 to rotate stepwise about the axis of rotation X among a plurality of angular positions each corresponding to predetermined positions of the engagement sleeves 44, 46, 56 and 58. The actuation unit may include an electric motor or a servo-assisted hydraulic device, if necessary coupled to a gear reduction unit.

The guide grooves 61, 62, 63 and 64 of the drum 60 are suitably shaped in such a manner that they cause each time, as a result of the rotation of the drum, at least one of the studs 65, 67, 69 and 71, and hence at least one of the respective engagement sleeves 44, 56, 46 and 58, to move (axial translation) according to predetermined operating modes to engage or disengage each time one or more gears. In this connection, FIG. 6 schematically shows the development in a plane of the guide grooves 61, 62, 63 and 64 of the drum 60 and the positions taken by the studs 65, 67, 69 and 71 (and hence by the engagement sleeves 44, 46, 56 and 58 operatively connected thereto) in each of the angular positions of the drum. The angular positions of the drum are indicated on the right side of the scheme of FIG. 6 by the symbol of the engaged gear(s).

Starting from the position indicated N, in which all the engagement sleeves 44, 46, 56 and 58 are in the central neutral position, the drum takes in sequence the following angular positions in the direction towards the forward gears:

an angular position (I/II) in which the engagement sleeve 44 associated with the stud 65 which slides in the guide groove 61 is in the shift position corresponding to the engagement of the first gear and the engagement sleeve 46 associated with the stud 69 which slides in the guide groove 63 is in the shift position corresponding to the engagement of the second gear, whereas the other two engagement sleeves 56 and 58 are in the central neutral position;

an angular position (II/III) in which the engagement sleeve 56 associated with the stud 67 which slides in the guide groove 62 is in the shift position corresponding to the engagement of the third gear and the engagement sleeve 46 associated with the stud 69 which slides in the guide groove 63 is in the shift position corresponding to the engagement of the second gear, whereas the other two engagement sleeves 44 and 58 are in the central neutral position;

an angular position (III/IV) in which the engagement sleeve 56 associated with the stud 67 which slides in the guide groove 62 is in the shift position corresponding to the engagement of the third gear and the engagement sleeve 46 associated with the stud 69 which slides in the guide groove 63 is in the shift position corresponding to the engagement of the fourth gear, whereas the other two engagement sleeves 44 and 58 are in the central neutral position;

an angular position (IV/V) in which the engagement sleeve 44 associated with the stud 65 which slides in the guide groove 61 is in the shift position corresponding to the engagement of the fifth gear and the engagement sleeve 46 associated with the stud 69 which slides in the guide groove 63 is in the shift position corresponding to the engagement of the fourth gear, whereas the other two engagement sleeves 56 and 58 are in the central neutral position;

an angular position (IV/VI) in which the engagement sleeve 46 associated with the stud 69 which slides in the guide groove 63 is in the shift position corresponding to the engagement of the fourth gear and the engagement sleeve 58 associated with the stud 71 which slides in the guide groove 64 is in the shift position corresponding to the engagement of the sixth gear, whereas the other two engagement sleeves 44 and 56 are in the central neutral position; and an angular position (VI) in which the engagement sleeve 58 associated with the stud 71 which slides in the guide groove 64 is in the shift position corresponding to the engagement of the sixth gear, whereas the other three engagement sleeves 44, 46 and 56 are in the central neutral position.

Between the angular position (I/II) and the angular position (II/III) an intermediate position (II) is provided in which the engagement sleeve 44 is moved into the central neutral position to disengage the first gear, whereas the engagement sleeve 46 remains in the shift position corresponding to the engagement of the second gear. Between the angular position (II/III) and the angular position (III/IV) an intermediate position (III) is provided in which the engagement sleeve 46 is moved into the central neutral position to disengage the second gear, whereas the engagement sleeve 56 remains in the shift position corresponding to the engagement of the third gear. Between the angular position (III/IV) and the angular position (IV/V) an intermediate position (IV) is provided in which the engagement sleeve 56 is moved into the central neutral position to disengage the third gear, whereas the engagement sleeve 46 remains in the shift position corresponding to the engagement of the fourth gear. Between the angular position (IV/V) and the angular position (IV/VI) an intermediate position (IV) is provided in which the engagement sleeve 44 is moved into the central neutral position to disengage the fifth gear, whereas the engagement sleeve 46 remains in the shift position corresponding to the engagement of the fourth gear.

Starting from position N, the drum takes in sequence the following angular positions in the direction towards the reverse gear:

an angular position (R/II) in which the engagement sleeve 56 associated with the stud 67 which slides in the guide groove 62 is in the shift position corresponding to the engagement of the reverse gear and the engagement sleeve 46 associated with the stud 69 which slides in the guide groove 63 is in the shift position corresponding to the engagement of the second gear, whereas the other two engagement sleeves 44 and 58 are in the central neutral position; and an angular position (R) in which the engagement sleeve 56 associated with the stud 67 which slides in the guide groove 62 remains in the shift position corresponding to the engagement of the reverse gear, whereas the engagement sleeve 46 associated with the stud 69 which slides in the guide groove 63 is moved into the central neutral position to disengage the second gear, the other two engagement sleeves 44 and 58 remaining in the central neutral position.

Moreover, since the guide grooves of the drum are shaped in such a manner that in one of the angular positions of the drum, the highest gear (fifth or sixth gear), associated to the first primary shaft 12, and the fourth gear, associated to the second primary shaft 14, are engaged at the same time, it is possible for the electric machine to operate as a generator when the vehicle is running with the highest gear (motorway gear) engaged to charge the batteries, as well as for the electric machine to be used as a booster. Moreover, the presence of a further angular position of the drum in which only the highest gear is engaged makes it possible to disconnect the electric machine when the vehicle is running with that gear engaged and the batteries are charged, thereby maximizing the efficiency of the propulsion system.

Since the guide grooves of the drum are shaped in such a manner that in one of the angular positions of the drum, the second gear and the reverse gear are engaged at the same time, parking manoeuvres can be performed in powershift mode. In fact, since the second gear and the reverse gear are driven by two different primary shafts, namely the second primary shaft 14 and the first primary shaft 12, respectively, parking manoeuvres can be performed keeping these two gears engaged at the same time and controlling the transmission of the torque in either of these gears by means of the two friction clutches. Moreover, parking manoeuvres can be normally driven by the electric machine or, if necessary, for example in case of exhaustion of the batteries, also by the internal combustion engine.

Moreover, since the guide grooves of the drum are shaped in such a manner that in one of the angular positions of the drum only the reverse gear is engaged, it is possible to drive the vehicle in reverse gear by means of the internal combustion engine even in case of breakage of the electric machine.

The above description relating to the gear shift device associated to the gearbox of FIGS. 2 and 3 applies to the gearbox of FIG. 1 as well, the only difference being that in this case the engagement sleeve 58 associated to the sixth gear is omitted and therefore the corresponding stud 71 and the corresponding guide groove 64 are omitted. As far as the angular positions of the drum are concerned, in this case the positions (IV/VI) and (VI) in which the sixth gear is engaged are obviously omitted, but the position (IV, V) in which the fifth gear (highest gear) and the fourth gear (gear associated to the second primary shaft, to which the electric machine is permanently cinematically connected) are engaged at the same time is still provided for.

Naturally, the principle of the invention remaining unchanged, the embodiments and manufacturing details may be widely varied with respect to those described and illustrated purely by way of non-limiting example.

What is claimed is:

1. A motor-vehicle hybrid propulsion system where the motor vehicle includes an internal combustion engine and a double-clutch transmission, said system comprising:

a mechanical gearbox having an odd number of forward gears of at least five, as well as one reverse gear, and an electric machine, said gearbox including a first primary shaft carrying driving gearwheels associated with the odd gears and the reverse gear, a second primary shaft coaxial with the first primary shaft and carrying driving gearwheels associated with the even gears, and at least one secondary shaft carrying a plurality of idle driven gearwheels operatively meshing with the driving gearwheels carried by the two primary shafts;

said gearbox including a gear shift device having a plurality of sliding engagement sleeves, each arranged to connect a driven gearwheel corresponding to a given gear for rotation with the respective secondary shaft, a corresponding plurality of sliding shift forks, each arranged to cause a respective engagement sleeve to slide between a neutral position and at least one shift position, and a rotary drum having an outer cylindrical surface including a corresponding plurality of guide grooves in each of which a respective stud slidably engages, said stud being connected for translation with a respective shift fork in the sliding direction of said shift fork, and an actuation unit arranged to cause the drum to rotate stepwise among a plurality of angular positions each corresponding to predetermined positions of the engagement sleeves;

wherein said electric machine is kinematically connected to the second primary shaft; and wherein said guide grooves of the drum are shaped in such a manner that, in a first angular position of said plurality of angular positions, the engagement sleeves are positioned so as to engage at the same time the highest odd gear and the fourth gear.

2. The hybrid propulsion system according to claim 1, wherein the guide grooves of the drum are shaped in such a manner that in a second angular position immediately adjacent to said first angular position the engagement sleeves are positioned so as to engage only the highest gear.

3. The hybrid propulsion system according to claim 1, wherein the gearbox has five forward gears and one reverse gear and wherein said plurality of engagement sleeves comprises a first engagement sleeve arranged to engage selectively the first gear or the fifth gear, a second engagement sleeve arranged to engage selectively the second gear or the fourth gear and a third engagement sleeve arranged to engage selectively the third gear or the reverse gear.

4. The hybrid propulsion system according to claim 1, wherein the electric machine is kinematically connected to the second primary shaft of the gearbox via a gear train including a pinion carried by an output shaft of the electric machine, at least one intermediate gearwheel and a driving gearwheel carried by the second primary shaft.

5. The hybrid propulsion system according to claim 4, wherein said driving gearwheel carried by the second primary shaft is associated to the second gear.

6. A motor-vehicle hybrid propulsion system where the motor vehicle includes an internal combustion engine and a double-clutch transmission, said system comprising:

a mechanical gearbox having six forward gears and one reverse gear, and an electric machine, said gearbox including a first primary shaft carrying driving gearwheels associated with the odd gears, to the sixth gear and the reverse gear, a second primary shaft coaxial with the first primary shaft and carrying driving gearwheels associated with the second gear and the fourth gear, and at least one secondary shaft carrying a plurality of idle driven gearwheels operatively meshing with the driving gearwheels carried by the two primary shafts;

said gearbox including a gear shift device having a plurality of sliding engagement sleeves, each arranged to connect a driven gearwheel corresponding to a given gear for rotation with the respective secondary shaft, a corresponding plurality of sliding shift forks, each arranged to cause a respective engagement sleeve to slide between a neutral position and at least one shift position, and a rotary drum having an outer cylindrical surface including a corresponding plurality of guide grooves in each of which a respective stud slidably engages, said stud being connected for translation with a respective shift fork in the sliding direction of said shift fork, and an actuation unit arranged to cause the drum to rotate stepwise among a plurality of angular positions each corresponding to predetermined positions of the engagement sleeves;

wherein said electric machine is kinematically connected to the second primary shaft; and wherein said guide grooves of the drum are shaped in such a manner that, in a first angular position of said plurality of angular positions, the engagement sleeves are positioned so as to engage at the same time the sixth gear and the fourth gear.

7. The hybrid propulsion system according to claim 6, wherein said plurality of engagement sleeves includes a first engagement sleeve arranged to engage selectively the first gear or the fifth gear, a second engagement sleeve arranged to engage selectively the second gear or the fourth gear, a third engagement sleeve arranged to engage selectively the third gear or the reverse gear, and a fourth engagement sleeve arranged to engage the sixth gear.

8. The hybrid propulsion system according to claim 6, wherein the guide grooves of the drum are shaped in such a manner that in a second angular position immediately adjacent to said first angular position the engagement sleeves are positioned so as to engage only the sixth gear.

9. The hybrid propulsion system according to claim 6, wherein the electric machine is permanently kinematically connected to the second primary shaft of the gearbox via a gear train including a pinion carried by an output shaft of the electric machine, at least one intermediate gearwheel and a driving gearwheel carried by the second primary shaft.

10. The hybrid propulsion system according to claim 9, wherein said driving gearwheel carried by the second primary shaft is associated with the second gear.

* * * * *